May 31, 1927.
R. E. McCLEARY
1,630,711
HYDRAULIC BRAKE MECHANISM
Original Filed Nov. 1, 1924      3 Sheets-Sheet 1
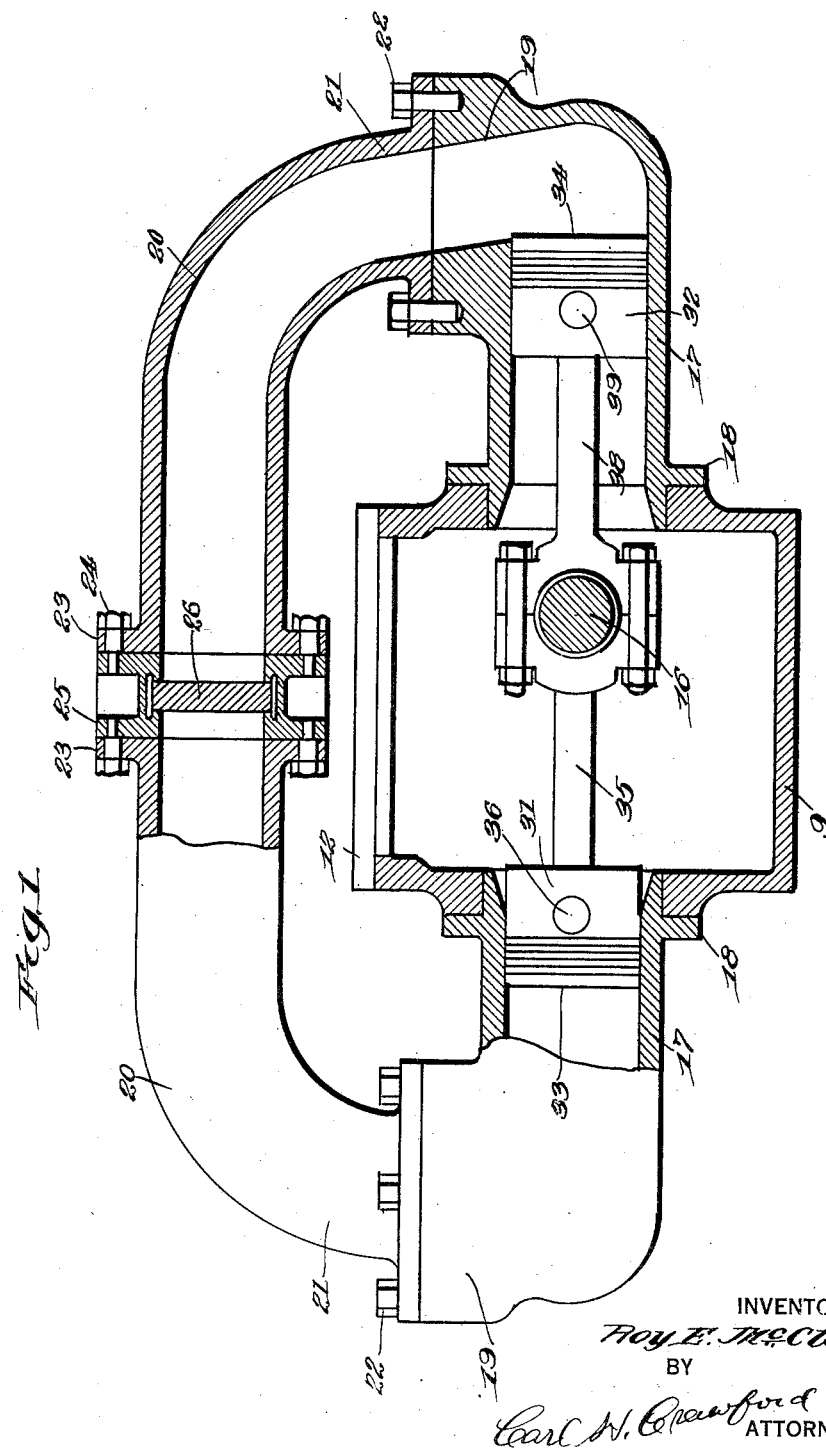
INVENTOR
*Roy E. McCleary*
BY
*Carl H. Crawford*
ATTORNEY

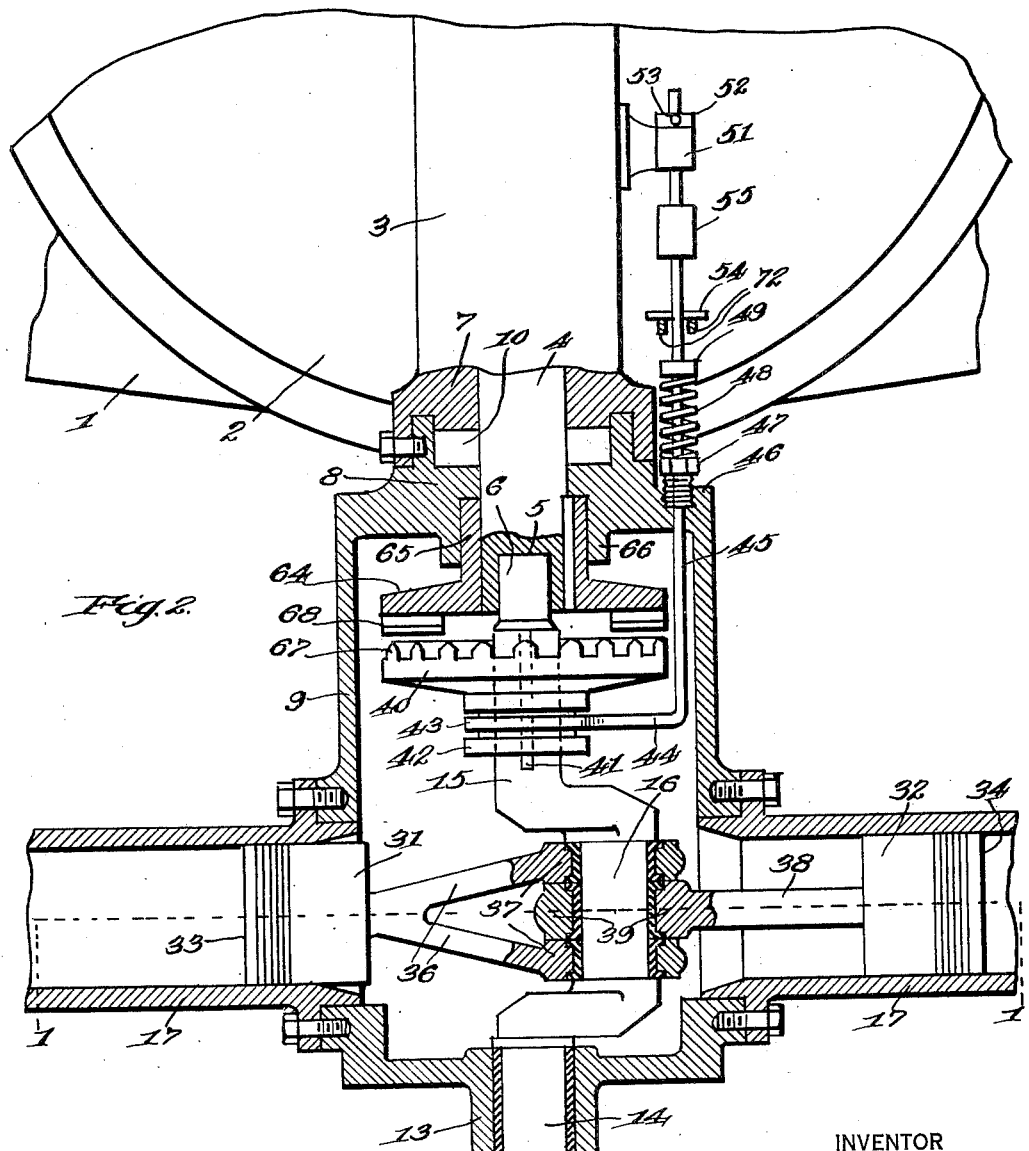

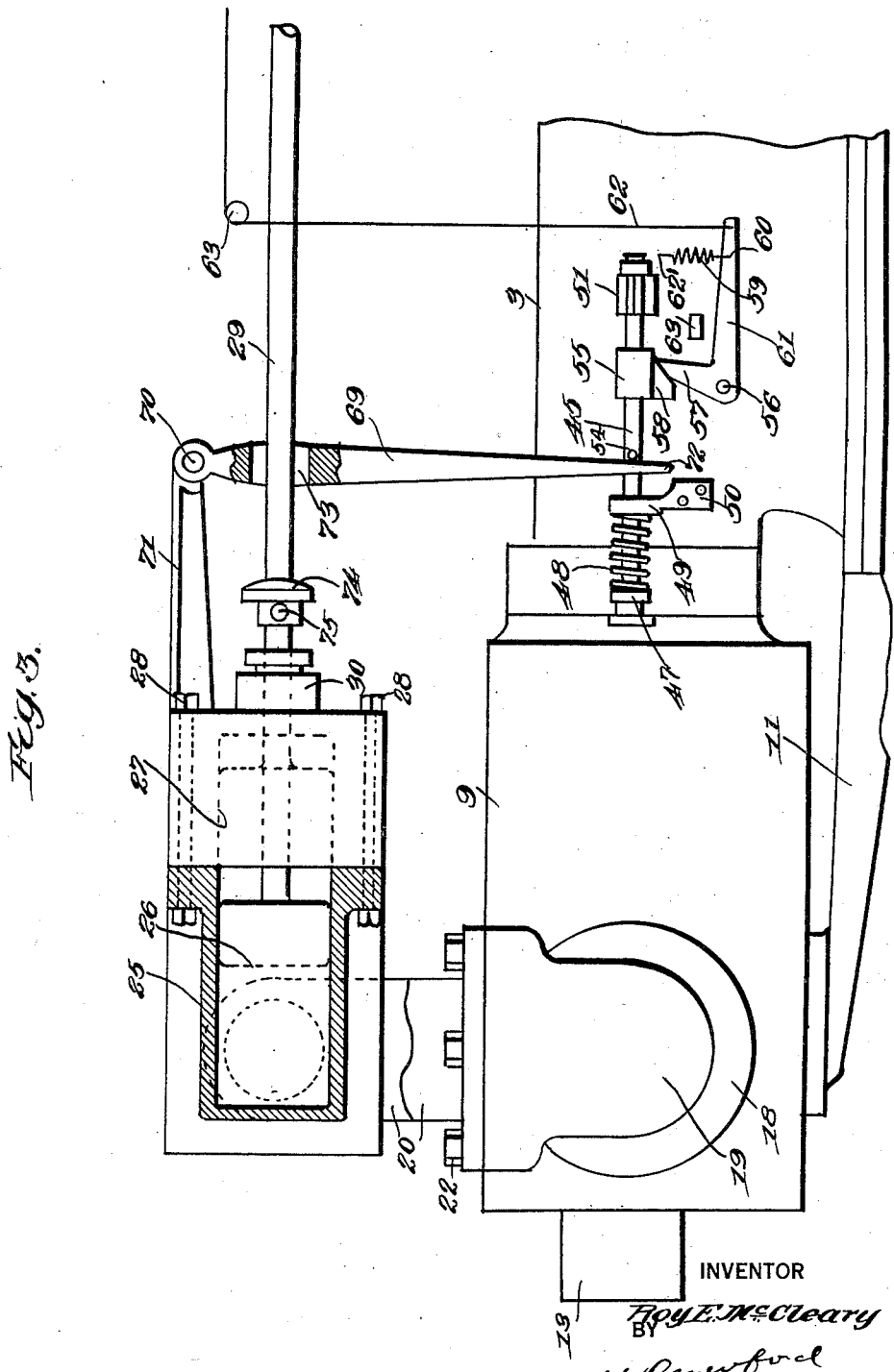

Patented May 31, 1927.

1,630,711

UNITED STATES PATENT OFFICE.

ROY E. McCLEARY, OF SEATTLE, WASHINGTON, ASSIGNOR TO McCLEARY HYDRAULIC BRAKE COMPANY, OF SEATTLE, WASHINGTON, A CORPORATION OF WASHINGTON.

HYDRAULIC-BRAKE MECHANISM.

Application filed November 1, 1924, Serial No. 747,379. Renewed December 18, 1926.

This invention relates to improvements in hydraulic brakes.

The device of my invention differs from that type of hydraulic brake in which an endless path or circuit for the oil is provided and in which one or more pistons are interposed in the oil path so that the oil is active on both faces of the pistons. In accordance with my improved device, a pair of pistons is employed and the pressure faces of the pistons constitute and form the terminals of the oil body, and in the most preferred form, these terminals or pressure faces are outwardly and oppositely disposed faces.

The construction is such that between the pistons, the crank or other connection whereby the pistons are connected up with a driven part of the truck or automobile, is disposed between the pistons, and the latter are, in this form of the invention, single acting pistons although because of the novel arrangement, said pistons are always acting upon or acted upon by the oil body. Hence, while they are not double acting pistons, they function in practically the same manner.

With the liquid or oil body interposed between the outer faces of the pistons, such body oscillates back and forth in the manifold or casing provided, and there is interposed in this oil body a single controlling valve, operated by the driver, which is capable of controlling or restricting the back and forth movement of the oil body in order to impart braking thrust to the driven member of the vehicle.

It is a feature of my invention to provide means whereby the brake mechanism, which is otherwise constantly driven during operation of the truck, may be thrown out of operation and allowed to remain in a position of rest.

It is a further feature to provide means whereby when it is desired to employ the braking mechanism, it will be automatically thrown into gear with the vehicle when the controlling valve of the mechanism is actuated.

In order to avoid what might be considered an objectionable vibration due to the reciprocating pistons, I have provided a novel arrangement whereby a portion of the oil body will always oscillate in a direction opposite to the direction in which the pistons move so that any vibration caused by the pistons will be neutralized by movement of the oil body.

It is also a feature of my invention to provide a casing structure through which the oil body travels which will have a bore cross section equal to the cross section of the cylinders so that undue friction will be avoided thereby eliminating heating of the oil and drag on the vehicle when the mechanism is not functioning as a brake.

A further feature consists in providing a controlling valve with a maximum area opening so that the oil body can pass the open valve as freely as it can traverse the cylinders or manifold.

My invention has many other features which will be more fully described in connection with the accompanying drawings and which will be more particularly pointed out in and by the appended claims.

In the drawings:—

Fig. 1, is a view partly in section and partly in elevation taken on line 1—1 of Fig. 2.

Fig. 2, is a plan view of a portion of the rear worm drive casing and rear axle housing of a truck with that part constituting my invention shown in section.

Fig. 3, is a view in elevation, partly in section, looking from the right of Fig. 2.

Like characters of reference designate similar parts throughout the different figures of the drawings.

As shown, 1 designates a portion of the rear axle housing of a worm drive heavy duty vehicle. The lower casing of the worm wheel, of the worm drive, not shown, is indicated at 2, and the worm casing is shown at 3. The rear end of the worm shaft is shown at 4, the same terminating in a socket 5, which is cylindrical and functions as a bearing for the adjacent end 6, of my improved crank shaft, which will be later referred to. The worm casing 3, has a tubular terminal 7, clearly shown in Fig. 2, into which a suitably formed terminal 8, of the crank case 9. is adapted to fit, a suitable packing being interposed at 10. The crank case 9, is supported on the rear axle housing, a bracket 11, being conventionally shown for this purpose. Access may be had at 12, to the upper portion of the crank case and a bearing 13, in said case is provided for the remaining end 14, of the crank shaft. Said shaft, which is indicated broadly at 15, has a crank portion 16.

Reference will next be made to the hydraulic casing in which the liquid or oil body is disposed, and which comprises, in part, a pair of cylinder sections, and in part, a manifold section forming a continuation of the cylinder sections.

The cylinder sections are indicated at 17, the same being shown bolted at 18, to opposite sides of the crank case 9, suitable openings in the latter being provided. As shown, these cylinder sections are horizontally disposed and terminate in upwardly extending elbows 19. A manifold, which may comprise two sections 20, has its end portions formed as elbows 21, the ends of which are bolted as at 22, to elbows 19. The remaining terminals 23, are shown secured by bolts 24, to a valve casing 25. A slide or gate valve 26, is housed in and is movable into different positions in said casing. By reference to Fig. 3, it will be seen that when the valve 26, is closed, it is wholly disposed within the casing 25. An extension casing 27, is shown secured to casing 25, by bolts 28, and this extension permits of movement of valve 26, to the right of the position shown in Fig. 3, into an open position wherein the valve 26 will project into extension casing 27. Valve 26 is provided with a stem 29, extending through a packing gland 30, on casing 27, and this stem is adapted to be suitably connected up for operation in an accessible position adjacent the driver's seat, which it is deemed unnecessary to show.

Pistons 31 and 32 are disposed in and are adapted to reciprocate in cylinder sections 17 and the pistons have outwardly facing pressure ends 33 and 34, respectively. Piston 31 has a connecting rod 35, pivoted therein at 36, the remaining end of said rod being connected with crank 16, by heads 37, forming terminals of the forked rod 36. Piston 32, has a connecting rod 38, pivoted therein at 39, the remaining end having a head 40, journalled on crank 16, between heads 37, as will be clearly seen by reference to Fig. 2.

It will be clear that the crank 16 is between the horizontally alined pistons and that as the crank rotates, the pistons will be reciprocated in the same direction, both moving either to the left or right of Fig. 1. Thus I do not provide an endless circuit for the oil, but on the other hand, I provide an arcuate casing terminating in end cylinder sections in which the pistons form the terminal abutments for the oil body.

In some instances, my invention will be used on trucks already equipped with the usual band brakes which latter are amply sufficient on level roads or in any case where the brakes are not called upon for extremely heavy duty. However, in descending a hill, especially when the truck is loaded, it is now the practice to use the engine, in part for braking action, and to employ the brakes in addition to the engine. However, when band brakes are given a prolonged application, they heat and burn and are quickly destroyed, as regards the lining. Even in freezing weather, I have had to bring a loaded truck to a position of rest and pour water on band brakes to prevent the lining from burning up. Now it is a primary object of this invention to employ my hydraulic brake mechanism wherever a prolonged or severe braking application is necessary, and at other times, to rely upon the usual band brakes. Therefore, it is a feature of my invention to provide means whereby my hydraulic brake mechanism may be disconnected from driven relation with the truck on long stretches of level road so that it will not be necessary to maintain the mechanism in constant operation. However, it is also a feature to provide means whereby when it is desired to use the hydraulic brake, the same may be quickly coupled into driven relation with the truck or other form of motor driven vehicle. The means for performing these foregoing functions, will next be described in detail.

A toothed clutch member 40 is splined or keyed at 41 for slidable adjustment on crank shaft 15 to be shifted longitudinally thereof. This clutch member has a grooved hub 42 in which is disposed a fork 43 of a shifting rod 44 which is bent at right angles and has an extension 45 which slidably projects through the end 46, of crank case 9. A packing gland 47, through which the extension projects, affords an oil tight joint. A spring 48, interposed between said gland and a stop bracket 49, anchored at 50, normally acts to hold said clutch member in the open or unclutched position shown in Fig. 2. Said extension 45, is journalled at its outer end in a bearing 51, mounted on worm casing 3, and is provided with a stop collar 52, which limits movement of said clutch member 40, to the predetermined open position shown in Fig. 2. This collar 52, is adjustable by a set screw 53, whereby certain adjustments may be made, the importance of which will presently appear Said extension 45, carries an actuating pin 54 and a locking dog 55, the purposes of which will next be described.

A retaining means is shown in the form of a bell crank lever pivoted at 56, to casing 3, and having a retaining arm 57 adapted to engage dog 55, or rather the projection 58, thereof. A spring 59, is connected at one end at 60, with arm 61, of said lever and at its other end 62, said spring is connected with any suitable stationary part such as the case 3. A stop lug 63, limit movement of arm 61 in an upward direction, viewing Fig. 4. When rod 45 is adjusted to the right of Fig. 3, to move member 40 toward and into a clutched position, dog projection 58 will ride over and depress arm 57, until the latter is released when arm 57 will engage the left hand face of projection 58 and lug 63 will retain the lever arm 61, so that the rod 45, will be positively held in a clutch closing position, independently of any other adjustment or actuation of the device. A cable 62, is connected with arm 61, and extends over a sheave 63, and forwardly to the driver's seat, where it is accessible to be actuated to adjust the bell crank lever to free projection 58, whereupon spring 48, will instantly shift clutch member 40, to the open or unclutched position shown in Fig. 2.

I will next describe the novel means whereby adjustment of valve 26, into an open position, will automatically clutch the brake mechanism into driven relation with the truck, after first describing the remaining or companion clutch member.

Said companion clutch member is indicated at 64, and the same has a hub 65 which is suitably fixed on the end of worm shaft 4, and is also journalled in an inwardly projecting bearing 66, of crank case 9. These clutch members 40 and 64, have suitably tapered teeth 67 and 68, respectively, to facilitate mesh engagement, the bases of said teeth being parallel so that when said members are in clutched relation, they will positively transmit driving thrust.

Next reverting to the means of actuating the clutch, 69 designates a lever which is pivoted at 70, to a suitable stationary arm 71. The lower end of said lever is forked at 72, to span rod 45, and engage actuating pin 54. Said lever 69, is bored at 73, for extension therethrough of valve rod 29, and on the latter is an actuating bumper 74, adjustably held by set screw 75. It will be noted that bumper 74 need only impart a comparatively slight movement to lever 69, in order to actuate rod 45, to the required position. Now the arrangement is such that when stem 29, is moved to the right of Fig. 3 it must be moved far enough to shift valve 26 to a position in excess of a full open position, in order to actuate the clutch. I have shown in dotted lines, the position to which valve 26 must be opened in order to shift rod 45, into a clutch in position. After this has been effected, then, as previously stated, rod 45 will be automatically held in such position by the retaining means described. Thereafter, and without in any way altering rod 45, the valve 26, can be adjusted into any working position with a view of partly or wholly restricting the oscillation of oil in the arcuate casing. If the driver wants to disconnect the brake mechanism from driven connection with the truck, he can at any time, pull the cable 62, and the spring 48 will instantly act to return member 40 to the position shown in Fig. 2.

Now the advantage of this novel construction is that when the valve 26, is fully opened, then there is absolutely no drag or load on the braking mechanism, and hence, this is the ideal time to shift the clutch into gear. Further, by means of this arrangement, the driver can very quickly move the rod 29, to the extreme position indicated, knowing that he will then have thrown the mechanism into driving clutch, whereupon, he can then apply braking action freely to any desired extent. Thus, an emergency application of braking power may be quickly employed when necessary. In some cases, where the driver is hauling a heavy load, or in case of an interurban bus, where the driver knows that he will have to descend steep hills, he will of course, leave the braking mechanism in driven relation.

It will be seen by reference to Fig. 1, that the bore of the arcuate casing is the same throughout the length of travel of the oil. In addition to this feature, it will be noted that when valve 26 is fully opened, said valve cannot offer any resistance to travel of the oil. Now it is because of these features that in actual trial on a five ton truck run many miles, that no appreciable drag was felt, and the arcuate casing did not heat, for the good and sufficient reason that the oil did not encounter anything more than normal resistance in its oscillating travel through the casing. Hence, because of these features, this brake mechanism might be in constant running service with the vehicle to which it was attached, and the clutch feature might be eliminated entirely. However, this constant operation would of course subject the mechanism to the usual wear that is common to any constantly operated mechanism, hence, I deem it a very great advantage to employ the clutch means heretofore described. However, on wet pavements, my brake mechanism will of course be in practically constant use for the reason that I apply braking action, through the differential and hence, both rear wheels will have uniform retardation applied thereto. This is practically impossible with band brakes unless they are perfectly adjusted and maintained in perfect adjustment. Where a perfect adjustment is not present, then braking action on the rear wheels is not the same, and this is what causes the vehicle to whirl around on wet pavements when the band brakes are applied.

It will also be noted that the greater length of the manifold is substantially parallel with the cylinder sections. Now as the pistons travel to the left of Fig. 1, the oil will be travelling to the right of said Figure, in the manifold, hence, because of this arrangement, I find that the oil in the manifold will substantially completely neutralize any vibration that might otherwise be generated by the reciprocating pistons and the device is to all intents and purposes, perfectly balanced when in operation.

By reason of the fact that the arcuate casing extends upwardly from the cylinder sections, it will be seen that the oil will always flow by gravity toward said sections, hence, even if the casing was not entirely full, there would always be behind each piston, a full supply of oil. However, in practice, I find it advantageous to substantially completely fill the casing by reason of the fact that only one controlling valve is employed.

It is a feature of very great importance to have the structure arranged so that only one controlling valve is necessary to impart braking power to a plurality of pistons. This is important not only because the action of the valve is uniform on all the pistons, but also to simplify the operating mechanism for actuating the single valve.

I claim:—

1. In a hydraulic brake mechanism, the combination with a driven member and a pair of pistons operated thereby and extending in opposite directions therefrom, and having outwardly facing pressure ends, of a hydraulic casing comprising cylinder sections housing said pistons and a manifold section forming a continuation of and connecting said cylinder sections to form an oil path, the bore of said manifold and cylinder sections being substantially uniform to eliminate drag, and a controlling valve interposed in said casing and having a full open position equal to the bore of said casing to eliminate drag and heat when the brake mechanism is not in braking operation.

2. In a hydraulic brake mechanism, the combination with a driven member and a pair of pistons reciprocably operated thereby and extending in opposite directions therefrom and having outwardly facing pressure ends, of an arcuate casing structure for the liquid having end portions forming cylinders in which said pistons are adapted to reciprocate and advance the liquid in opposite directions in said casing, and a single controlling valve interposed in said casing structure for restricting movement of the liquid through said casing structure by said pressure ends to apply braking power to said member.

3. In a hydraulic brake mechanism, the combination with a driven crank member, of an arcuate casing structure having alined cylinder sections extending toward and having open ends adjacent and on opposite sides of said member, a piston in each cylinder section having an outwardly facing pressure end and said pistons being connected with said crank member to be reciprocated in said cylinder sections, said casing structure being filled from one pressure end to the other whereby said liquid will be oscillated through said casing as said pistons reciprocate, and a single valve interposed in said casing between the pressure ends of said pistons for limiting oscillating movement of the liquid to apply braking power to said crank member.

4. In a hydraulic brake, the combination with a driven crank member, of a casing structure having alined cylinder sections, pistons in said sections connected with said crank member to be reciprocated thereby, said structure having a manifold section connected with said cylinder sections and extending substantially parallel therewith whereby when said pistons are reciprocated in one direction the oil in the parallel portion of said manifold will be forced in a direction opposite to the direction in which the pistons reciprocate to neutralize vibration, and a valve interposed in said manifold to apply braking action to said crank member by controlling liquid flow through said manifold.

5. In combination, a motor driven vehicle, a hydraulic brake mechanism therefor, valve means for hydraulically actuating said brake mechanism to apply braking action, a clutch device whereby said brake mechanism may be connected into or disconnected from driven relation with respect to said vehicle, and means accessible to the driver for connecting said brake mechanism into driven relation with the vehicle and actuating said valve means.

6. In combination, a motor driven vehicle, a hydraulic brake mechanism therefor, valve means for hydraulically actuating said brake mechanism to apply braking action, a clutch device whereby said brake mechanism may be connected into or disconnected from driven relation with respect to said vehicle, and means for actuating said valve means to free said brake mechanism from load and automatically throwing said mechanism into driven relation to said vehicle.

7. In combination, a motor driven vehicle, a hydraulic brake mechanism therefor, valve means for hydraulically actuating said brake mechanism to apply breaking action, a clutch device for connecting or disconnecting said mechanism with or from driven relation with said vehicle, means for simultaneously opening said valve means and actuating said clutch to throw said mechanism into driven relation with said vehicle, and means for automatically holding said clutch device in a clutched position irrespective of adjustment of said valve means.

8. In combination, a motor driven vehicle, a hydraulic brake mechanism therefor, valve means for applying braking power to said mechanism, a clutch device for connecting or disconnecting said mechanism to or from driven relation with said vehicle, means for opening said valve means and then actuating said clutch device to connect said mechanism into driven relation with said vehicle, means for holding said clutch device in a closed position, and means for releasing said clutch device from a closed position.

9. In a hydraulic brake, the combination with a motor driven vehicle having a worm drive including a worm having a projecting shaft, a crank shaft having one end journalled in the end of said worm shaft, a hydraulic brake mechanism for transmitting braking power to said crank shaft, and a clutch device for connecting said mechanism into driven relation with said worm shaft and comprising a clutch member fixed to said worm shaft and a clutch member slidably keyed on said crank shaft.

10. In a hydraulic brake mechanism, the combination with a motor driven vehicle having a worm casing, a crank case connected with said worm casing, cylinder sections connected with said crank case, manifold section connected with said cylinder sections and forming therewith an oil path of travel, a valve casing connected with said manifold sections and having a valve for controlling the travel of oil therethrough, and mechanism in said structure for applying braking action to the vehicle.

11. In a hydraulic brake mechanism, the combination with a vehicle having a driven member and a plurality of pistons driven thereby, of an oil casing including cylinders for said pistons and a path of travel for the oil, the bore of said casing and cylinders being uniform whereby the oil will flow as freely in any part of said casing as it does in said cylinders, and valve means for restricting the flow of oil to apply braking action to said member.

12. In a hydraulic brake mechanism, the combination with a vehicle having a driven member and a plurality of pistons driven thereby, of an oil casing including cylinders for said pistons and a path of travel for the oil, the bore of said casing and cylinders being substantially uniform whereby the oil will flow as freely in any part of said casing as it does in said cylinders, and a valve for restricting flow of oil in said casing and having a full open position equal to the bore of said casing.

13. In combination, a motor driven vehicle, a hydraulic brake therefor normally out of driven relation with the vehicle, means for controlling the oil to apply brakage, and a device actuated by said means for connecting the brake into driven relation with the vehicle on actuation of said means.

14. In combination, a motor driven vehicle, a hydraulic brake therefor normally out of driven relation with the vehicle, means for controlling the oil to apply brakage, and a device actuated by said means for connecting said brake into driven relation with the vehicle when said means is moved out of an oil controlling position.

In testimony that I claim the foregoing as my own, I hereby affix my signature.

ROY E. McCLEARY.